United States Patent [19]
He et al.

[11] Patent Number: 5,951,963
[45] Date of Patent: Sep. 14, 1999

[54] PHOSPHOROUS CONTAINING ZEOLITE HAVING MFI TYPE STRUCTURE

[75] Inventors: Mingyuan He; Xiaoming Yang; Xingtian Shu; Jinge Luo, all of Beijing, China

[73] Assignees: China Petrochemical Corporation; Research Institute of Petroleum Processing, Sinopec, both of Beijing, China

[21] Appl. No.: 09/046,630

[22] Filed: Mar. 24, 1998

[30] Foreign Application Priority Data

Mar. 24, 1997 [CN] China .................................. 97103635

[51] Int. Cl.⁶ .................................................. C01B 39/10
[52] U.S. Cl. .......................... 423/713; 423/709; 423/712; 423/DIG. 22; 423/DIG. 30; 502/85; 502/86; 502/60; 502/77
[58] Field of Search ..................................... 423/700, 712, 423/713, DIG. 22, DIG. 30, 709; 502/60, 77, 85, 86

[56] References Cited

U.S. PATENT DOCUMENTS

| | | |
|---|---|---|
| 3,972,832 | 8/1976 | Butter et al. . |
| 4,356,338 | 10/1982 | Young . |
| 4,374,294 | 2/1983 | Chu . |
| 4,391,739 | 7/1983 | Chu . |
| 4,399,059 | 8/1983 | Chu . |
| 4,456,780 | 6/1984 | Young . |
| 4,528,172 | 7/1985 | Rieck et al. ..................... 423/DIG. 22 |
| 4,578,371 | 3/1986 | Rieck et al. . |
| 4,590,321 | 5/1986 | Chu .......................................... 585/415 |
| 4,605,637 | 8/1986 | Chang et al. . |
| 4,650,655 | 3/1987 | Chu et al. . |
| 4,791,084 | 12/1988 | Sato et al. . |
| 5,080,878 | 1/1992 | Bowes et al. . |
| 5,171,921 | 12/1992 | Gaffney et al. . |
| 5,232,675 | 8/1993 | Shu et al. . |
| 5,367,100 | 11/1994 | Gongwei et al. ........................ 585/640 |
| 5,378,670 | 1/1995 | Kumar ...................................... 502/60 |
| 5,380,690 | 1/1995 | Zhicheng et al. . |
| 5,538,710 | 7/1996 | Guo et al. ............................... 423/701 |

*Primary Examiner*—Mark L. Bell
*Assistant Examiner*—David Sample
*Attorney, Agent, or Firm*—Birch, Stewart, Kolasch & Birch, LLP

[57] ABSTRACT

The present invention discloses a phosphorus-containing zeolite having MFI type structure. The anhydrous composition (based on the mole ratios of oxides) of the above zeolite is $$0.01-0.3Na_2O.Al_2O_3.0.2-1.5P_2O_5.30-90SiO_2$$

Said zeolite possesses a X-ray diffraction pattern listed in Table 1. The pore volume ratio of 1.0–10 nm mesopore to 10-membered ring pore is no less than 0.5. The crystal particle size of said zeolite is in the range of 0.8–2.0 micron. Said zeolite exhibits superior hydrothermal stability in catalytic conversion of hydrocarbons. Especially, when said zeolite is applied in catalytic cracking of hydrocarbons, it will enhance the crackability of large molecules, improve gasoline octane value and stability, and reduce the sulfur content in the gasoline as well.

14 Claims, 2 Drawing Sheets

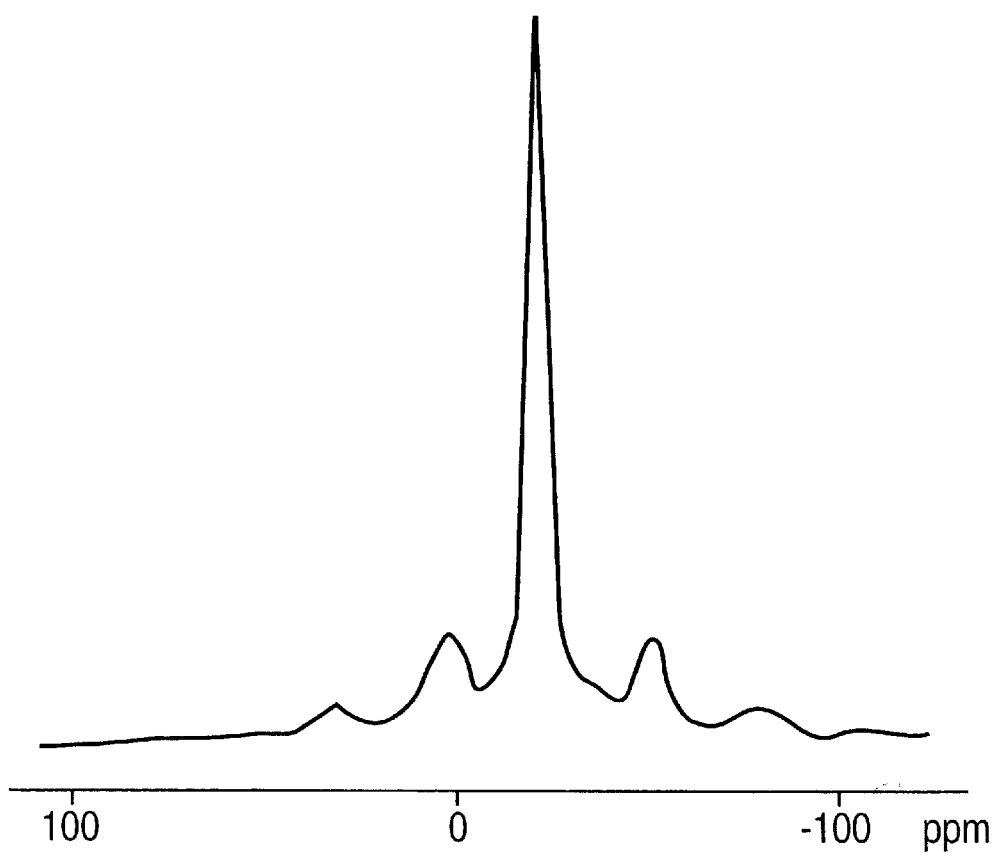

PHOSPHOROUS CONTAINING ZEOLITE HAVING MFI TYPE STRUCTURE

FIELD OF THE INVENTION

The present invention relates to a zeolite having MFI type structure. More particularly, the present invention relates to a phosphorus-containing zeolite having MFI type structure.

BACKGROUND OF THE INVENTION

Zeolite having MFI (structure symbol recommended by International Union for Pure and Applied Chemistry in 1978) type structure, such as ZSM-5 developed by Mobil Oil Corporation since 1972, has been applied extensively as a catalytic material to various hydrocarbon conversion reactions. With the development of new applications, extensive research has been carried out to improve its catalytic performance, besides its synthesis method.

U.S. Pat. No. 3,972,832 discloses a phosphorus-containing zeolite which has been prepared by treating H-ZSM zeolite with a phosphorus-containing compound solution and heating the above-mentioned system. The thus obtained zeolite contains 0.78–4.5 wt. % phosphorus. Said zeolite can be used as a catalyst for the conversion of paraffinic compounds, especially paraffinic hydrocarbons.

U.S. Pat. Nos. 4,374,294, 4,391,739 and 4,399,059 disclose a zeolite catalyst composition containing phosphorus and a metal selected from Group IA and /or Group IIIA (Sc, Y, and RE) of the Periodic Chart of the Elements. The process for preparing said composition comprises impregnating ZSM zeolites with an aqueous diammonium hydrogen phosphate solution, and calcining them at a temperature of 400–700° C. in the presence of 5–100% steam. Said zeolite catalyst exhibits good para-selectivity in the conversion of substituted aromatic compounds.

U.S. Pat. Nos. 4,356,338 and 4,456,780 relate to a method for extending the life of ZSM zeolite catalyst by treating the catalyst with a phosphorus containing compound to deposit 2–15 wt. % phosphorus on said catalyst. Then, said catalyst is calcined at 250–1000° C. in the presence of 5–100% steam for 15 min. to 100 hours. Said method can also be carried out by treating the catalyst first with steam, then with a phosphorus containing compound.

U.S. Pat. No. 4,578,371 discloses a process for the manufacture of a phosphorus containing ZSM-5 zeolite, comprising mixing water, a silicon dioxide source, an alkali metal hydroxide and an aluminum compound, and crystallizing said mixture at a temperature of 95–230° C. without addition of an organic compound, but in the presence of aluminum phosphate.

U.S. Pat. No. 4,605,637 discloses a method for enhancing the catalytic activity of a low acidity zeolite, such as boron-containing ZSM-5 zeolite or ZSM-5 zeolite with a silica/alumina ratio over 70, by contacting said zeolite with an activating solution containing an effective amount of aluminum phosphate at a temperature of 80–370° C.

U.S. Pat. No. 4,791,084 discloses a method for preparing a cracking catalyst by mixing crystalline aluminosilicate particles and alumina particles having been impregnated with a phosphorus component. Said catalyst exhibits better metal poinsoning resistance, higher cracking activity and improved gasoline selectivity in cracking of a heavy oil.

U.S. Pat. No. 5,080,878 relates to a process for reducing the surface activity of ZSM-5 zeolite, by contacting said zeolite with an aqueous fluorosilicate salt, preferably $(NH_4)_2SiF_6$, to substitute the aluminum atom by silicon atom. Therefore, the catalytic activity of said zeolite is enhanced for a variety of hydrocarbon conversion reactions, in particular, for the oligomerization of olefins to prepare a lube base oil with high viscosity index.

U.S. Pat. No. 5,171,921 discloses a method for producing olefins wherein the catalyst is treated by impregnating ZSM-5 zeolite having a Si/Al ratio of 20–60 with a phosphorus-containing solution so as to render the zeolite to contain 0.1–10 wt. % phosphorus and steam-activating the zeolite at 500–700° C. under a pressure of 1–5 atm. for 1–48 hours. Said steam activation can also be effected by adding 1–50% (mole ratio) steam into hydrocarbon feedstock during the conversion reaction. Said zeolite can be used as an active component in converting olefin and/or paraffin to $C_2$–$C_5$ light olefins.

U.S. Pat. No. 4,650,655 discloses a process for synthesizing ZSM-5 zeolite by using zeolites other than ZSM-5 as seed crystals. It is reported in the patent that ZSM-5 zeolite with a relative crystallinity of 110% is synthesized by using NaY zeolite as seed crystals in the presence of tetrapropyl ammonium bromide and crystallizing at 212° F. (100° C.) for 80 hours. (The relative crystallinity of said zeolite is compared with the zeolite synthesized by using ZSM-5 zeolite as seed crystals)

U.S. Pat. No. 5,232,675 discloses a rare earth-containing high-silica zeolite having penta-sil type structure. The anhydrous composition of said zeolite can be defined by the formula $xRE_2O_3 \cdot y\ Na_2O \cdot Al_2O_3 \cdot zSiO_2$, wherein x=0.01–0.30, y=0.41.0, and z=20–60. Owing to the 24 times higher normal hexane/cyclohexane adsorption ratio than that of ZSM-5 zeolite, the pore opening of said zeolite is narrower than that of ZSM-5 zeolite. Said zeolite is synthesized by well distributing the seed crystals into a colloid system composed of water glass, an aluminium salt, an inorganic acid, and water, and then crystallizing at 130–200° C., preferably 160–190° C., for 12–60 hours, preferably for 16–30 hours. Said seed crystals are REY, REHY, or REX which contains rare earth elements 2–27% and sodium<7.0%(both based on the weight of oxides). As compared with the conventional ZSM-5 zeolite, said zeolite possesses a higher catalytic activity and better hydrothermal stability.

U.S. Pat. No. 5,380,690 discloses a cracking catalyst for producing lower olefins, wherein a phosphorus and rare earth-containing high silica zeolite having a structure of pentasil (P-ZRP) is used. Said P-ZRP zeolite is prepared by treating the zeolite described in U.S. Pat. No. 5,232,675 with an aluminum phosphate sol, and then activating the zeolite in steam. More specifically, it is prepared by pre-exchanging the zeolite with ammonium ion to reduce its sodium content to a level of less than 0.1 wt. % (based on $Na_2O$), then evenly mixing the zeolite with an aluminum phosphate sol according to the weight ratio of aluminum phosphate sol (based on $P_2O_5$): zeolite (dry base)=1:(5–99), followed by calcining the mixture at 300–600° C. for 0.5–6 hours in the presence of 10–100% steam. Said aluminum phosphate sol has a composition of $Al_2O_3:P_2O_5$=1:(1–3). The thus-obtained zeolite has a phosphorus content of 2–20 wt. %. Said zeolite catalyst exhibits better hydrothermal stability, improved bottom conversion and higher $C_2$–$C_5$ light olefins yields.

The mesopore of the zeolite plays an important role in improving catalytic performance, especially reaction capacity of large molecules reactions. It has not been reported in the prior art that any MFI type zeolite possesses so large amount of mesopore in the range of 1.0–10 nm.

It is an object of the present invention to provide a highly hydrothermal stable phosphorus containing MFI type zeolite, especially having a large amount of mesopore in the range of 1.0–10 nm. It is a further object of this invention to provide a method for preparing said zeolite.

SUMMARY OF THE INVENTION

The present invention provides a phosphorus containing MFI type zeolite having an anhydrous chemical composition of the formula (based on mole ratios of oxides):

$$0.01-0.3Na_2O.Al2O3.0.2-1.5P_2O_5.30-90SiO_2$$

Said zeolite possesses X-ray diffraction patterns listed in Table 1 and a pore volume ratio of 1.0–10 nm mesopore to 10-membered ring pore (0.5–0.6 nm) being no less than 0.5. The crystal particle size of said zeolite is in the range of 0.8–2.0 micron.

The phosphorus containing MFI type zeolite of the present invention is prepared according to the following procedures: selecting a faujusite such as NaY, HY or $NH_4$ as seed crystals; adding said seed crystals to a colloid system composed of water glass, an aluminum salt, an inorganic acid, and water to carry out a crystallization reaction; ion-exchanging the obtained crystalline product into $NH_4$-form; dealuminating the zeolite by $H_2SiF_6$; and activating the obtained zeolite with a phoshorus-alumina activating agent in the presence of steam at elevated temperature.

BRIEF DESCRIPTION OF THE DRAWING

FIG. 2 is the $^{31}$P-MAS NMR spectrum of said zeolite prepared by Example 1.

DETAILED DESCRIPTION OF THE INVENTION

Figure 1:
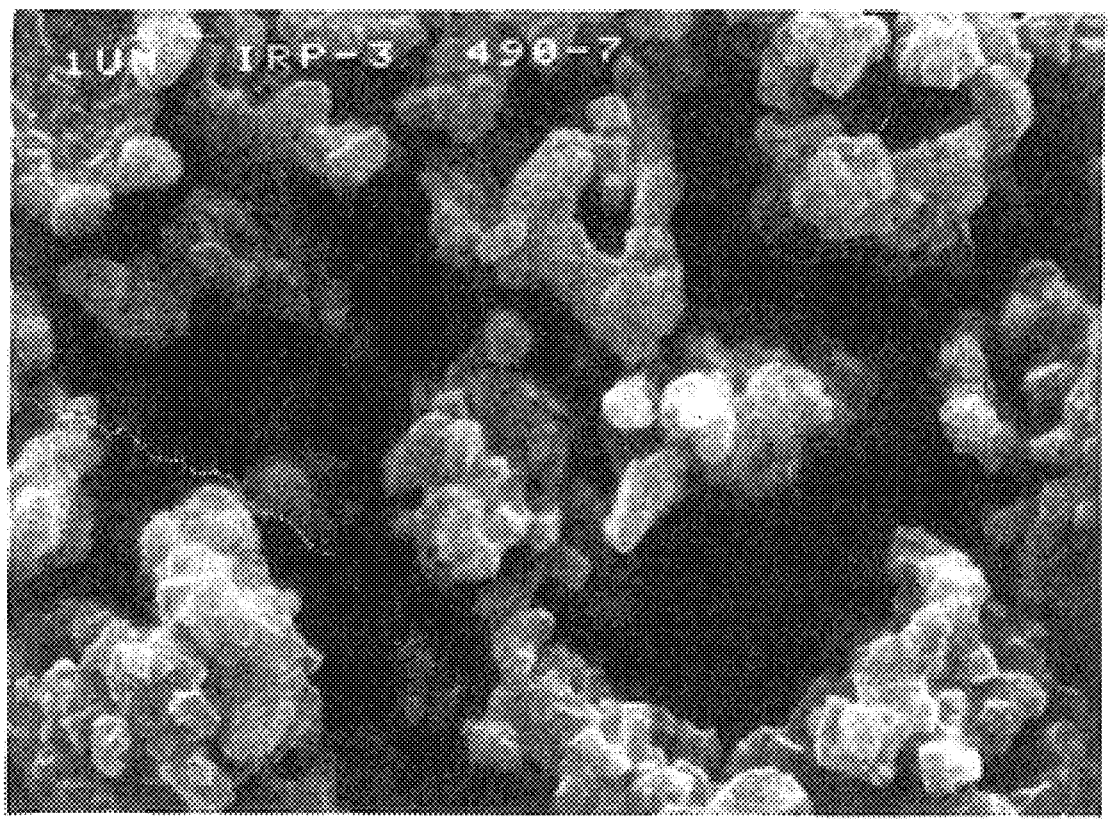
FIG. 1 is the TEM micrograph of said zeolite prepared by Example 1.

The present invention provides a phosphorus containing MFI type zeolite having an anhydrous chemical composition of the formula (based on mole ratios of oxides):

$$0.01-0.3Na_2O.Al_2O_3.0.2-1.5P_2O_5.30-90SiO_2$$

Said zeolite possesses X-ray diffraction patterns listed in Table 1 and a pore volume ratio of 1.0–10 nm, preferably 3.0–5.0 nm mesopore to 10-membered ring pore (0.5–0.6 nm) being no less than 0.5. The crystal particle size of said zeolite is in the range of 0.8–2.0 micron.

The phosphorus containing MFI type zeolite according to the present invention possesses the following characteristics:

1. Said zeolite has an anhydrous chemical composition of the following formula (based on mole ratios of oxides):

$$0.01-0.3Na_2O.Al_2O_3.0.2-1.5P_2O_5.30-90SiO_2$$

2. Said zeolite possesses X-ray diffraction data listed in Table 1. The symbols used in Table 1 represent the relative intensity in the XRD spectra:VS:80–100%; S:60–80%; M:40–60%; W:20–40%; VW:<20%.

TABLE 1

X-ray diffraction pattern data of the zeolite of the present invention

| $d/ \times 10^{-1}$ nm | $I/I_0$ |
|---|---|
| 10.01 ± 0.2 | M |
| 6.56 ± 0.1 | VW |
| 6.00 ± 0.1 | VW |
| 4.27 ± 0.08 | VW |
| 3.86 ± 0.07 | VS |
| 3.82 ± 0.07 | S |
| 3.76 ± 0.05 | W |
| 3.72 ± 0.05 | W |
| 3.65 ± 0.05 | W |

3. In the $^{27}$Al-MAS NMR spectrum of said zeolite, a peak at chemical shift of 55–60 ppm is assigned to the Al(4Si) coordination (one $AlO_4$ is linked with four $SiO_4$), besides, another peak at about 40 ppm is assigned to the Al(4P) coordination (one $AlO_4$ is linked with four $PO_4$). In the $^{31}$P-MAS NMR spectrum of said zeolite, a peak at about −29 ppm is due to the P(4Al) coordination (i.e. an inter-reaction between $PO_4$ and adjacent $AlO_4$ exists.), as shown in FIG. 2. Based on the above results, it is assumed that the phosphorus atoms contained in said zeolite are chemically bonded with the Al atoms in the framework of the zeolite.

Furthermore, the phosphorus contained in said zeolite is evenly distributed in the surface layer of said zeolite crystal. The results of Transmission Electron Microscope (TEM)-Energy Diffraction Spectra (EDS) showed that the phosphorus content was nearly at the same level in the surface layer of any crystal particles in said zeolite (Table 2).

TABLE 2

| $P_2O_5$ contents(wt %) on the surface layer of crystal particles of randomly taken samples | | | | | | |
|---|---|---|---|---|---|---|
| zeolite of the present invention, wt % | 1.87 | 1.88 | 1.90 | 1.89 | 1.87 | 1.90 |
| even mixture of zeolite ZSM-5 and $AlPO_4$, wt. % | 2.48 | 0.92 | 1.01 | 3.14 | 0.05 | 0.02 |

4. The pore volume ratio of the mesopore ranging 1.0–10 nm in diameter, especially 3.0–5.0 nm in diameter to the 10-membered ring pore (pore diameter of 0.5–0.6 nm) is no less than 0.5. This is a characteristic of the zeolite of the present invention. In the conventional ZSM-5 zeolite having the same structure, only 10-membered ring micropore (pore diameter 0.5–0.6 nm) exists, whereas the zeolite of the present invention has a relatively large amount of mesopores as compared with the conventional ZSM-5 zeolite.

5. The crystal particle size of said zeolite is in the range of 0.8–2.0 micron.

Said phosphorus containing MFI type zeolite according to the invention is prepared by the following procedures:

a. Crystallization: a seed crystal is dispersed homogeneously into a colloid system comprising of water glass, an aluminum salt, an inorganic acid, and water, and the thus obtained mixture is crystallized at 130–200° C. for 10–60 hours. Said seed crystal can be one or more of the following zeolites: NaY, $NH_4Y$, HY, NaX or HX, preferably $NH_4Y$ and HY. The mole composition of said colloid system is as follows: $SiO_2/Al_2O_3$=30–100, $Na_2O/Al_2O_3$=5–10, $H_2O/SiO_2$=15–50, the amount of $Na_2O$ herein indicates the alkalinity of said system, not including the amount of $Na_2O$ neutralized by the acid.

Said water glass can be preheated to 60–100° C. before mixing with other components so as to decrease the viscosity of the said colloid system and the crystal particle size of said zeolite.

The amount of said faujusite seed crystals used should be such that the mole ratio of $Al_2O_3$ provided by the seed crystal to $Al_2O_3$ provided by other components in said colloid system is in the range of 0.4–0.8.

Said aluminum salt is $Al_2(SO_4)_3$, $AlCl_3$, or an aluminum salt of phosphoric acid selected from for example $AlPO_4$, $Al_2(HPO_4)_3$, and $Al(H_2PO_4)_3$.

Said inorganic acid is selected from phosphoric acid, sulfuric acid, hydrochloric acid, and nitric acid. The amount of the inorganic acid used should make the alkalinity of said reaction system in the range of the mole ratios of the colloid system.

b: Ammonium ion-exchange: said crystalline product in step a is ion-exchanged with an aqueous ammonium salt solution according to the weight ratio of crystalline product: ammonium salt:$H_2O$=1:(0.2–1.0):(5–20) at 60–95° C. for 0.5–2 hours. Said ammonium salt can be a conventional inorganic acid ammonium salt, such as $(NH_4)_2SO_4$, $NH_4Cl$, $(NH_4)_3PO_4$, or $NH_4NO_3$.

The amount of Na2O in $NH_4^+$-form crystalline product is normally less than 0.1 wt %.

c: Dealumination: said $NH_4^+$-form crystalline product in step b is dealuminated by reacting with an aqueous $H_2SiF_6$ solution at 50–70° C., for 1–5 hours, according to the weight ratio of $NH_4^+$-type crystalline product: $H_2SiF_6$:$H_2O$=1: (0.05–0.3):(3–20).

The mole ratio of $SiO_2/Al_2O_3$ in the framework of said dealuminated crystalline product should be 35–90.

d: Activation: said dealuminated crystalline product in step c is evenly mixed with an d: Activation: said dealuminated crystalline product in step c is evenly mixed with an activating agent containing phosphorus and aluminum (based on $P_2O_5$) according to the weight ratio of crystalline product : said agent=1: (0.05–0.80), then the resulted mixture is calcined at 400–650° C., with 10–100% steam for 1–5 hours.

Said phosphorus-alumina activaing agent is composed of pseudo-boehmite and phosphoric acid according to the mole ratio of $Al_2O_3$:$P_2O_5$=1:(3–6).

As has heretofore been stated, a particular activating agent containing phosphorus and aluminum is used to treat the MFI type zeolite of the invention according to a special procedure of the present invention. The phosphorus in said phosphorus containing MFI type zeolite might be chemically bonded with the framework Al atom of the zeolite. Therefore, said zeolite exhibits superior hydrothermal stability than conventional HZSM-5 zeolite. For example, after hydrothermal treatment at 800° C. in 100% steam for 12 hours, the n-$C_{14}$ alkane cracking activity of conventional zeolite HZSM-5 decreased from 90% to 35%, however, the activity of the present zeolite was nearly the same as before treating. (cf Example 7)

The phosphorus containing MFI type zeolite of the present invention can be used in all catalytic conversion processes in which conventional ZSM-5 can be used. Furthermore, owing to its large amount of mesopore in the range of 1.0–10 nm, said zeolite is suporior for reactions involving larger molecules, e.g. in the catalytic conversion of heavy petroleum hydrocarbons, as compared to the conventional ZSM-5 zeolite. When said zeolite, as an active component of cracking catalyst, is applied in catalytic cracking of hydrocarbons, it will enhance the crackability of large molecules, improve gasoline octane value and stability, and reduce the sulfur content in the gasoline products as well, as compared with conventional zeolite ZSM-5.

EXAMPLES

The present invention will be further described with reference to the following samples. However, these examples are not to be construed to limit the scope of the present invention.

In all the following examples and comparative examples, the chemical compositions of the zeolite product, such as $Na_2O$, $Al_2O_3$, and $SiO_2$ were determined by chemical analysis; the $P_2O_5$ content of said zeolite was determined by X-ray fluorescence spectroscopy; X-ray diffraction (XRD) data of said zeolite was obtained with a Rigaku D/Max-IIIA X-ray diffraction apparatus (made in Japan) using the Cu—Kα radiation; the phosphorus content of the crystal surface layer was determined by scanning electronc microscope with microprobe analysis (TEM-EDS) method, using an integrated device of a JEOL JEM-2000 FXII high resolution apparatus and a LINK QX-2000 Energy Spectra apparatus. The crystal particle size of the zeolite was determined by ISI-60A SEM; $^{31}$P-MAS NMR spectrum was obtained with a BRUKER AM-300 MAS apparatus; mesopore and micropore (10-membered ring) volumes were determined by the low temperature nitrogen adsorption method, using the standard procedure of ASTM D-4641–87.

EXAMPLE 1

150 g (95% dry base) of HY zeolite having silica/alumina mole ratio of 5.0 (manufactured by Catalyst Plant of Changling Petrochemical Works, Hunan province, China), was used as seed crystals and dispersed in 1300 g of water glass (manufactured by Catalyst Plant of Changling Petrochemical Works) containing 3.5 wt. % $Na_2O$ and 11.0 wt. % $SiO_2$. 1300 g of an aqueous $Al_2(SO_4)_3$ solution containing 2.5 wt. % $Al_2O_3$ was added to the above mixture while stirring. An aqueous 20 wt. % $H_2SO_4$ solution was used to adjust the pH of the above system making it into a colloidal state at pH 11.5. The prepared colloid was crystallized at 180° C. for 16 hours. After filtration and washing, the crystalline product was obtained.

1000 g (dry base) of the above-prepared crystalline product was ion-exchanged with 6250 g of an aqueous 8 wt. % ammonium sulfate solution for 1 hour at 60° C. while stirring. After filtration and washing, the $NH_4^+$-form crystalline product was obtained.

100 g (dry base) of said $NH_4^+$-form crystal was dealuminated by reacting with 1600 g of an aqueous 0.5 wt. % $H_2SiF_6$ solution at 50° C. for 5 hours while stirring, then followed by filtration and washing.

Said dealuminated crystalline product was evenly mixed with 40 g of $H_2O$ and 8.4 g of phosphorus-alumina activating agent, composed of pseudo-boehmite (manufactured by Shandong Aluminum Works, China) and $H_3PO_4$, containing 4.4 wt. % $Al_2O_3$ and 30.0 wt. % $P_2O_5$, followed by drying at 120° C. for4 hours, then activated at 600° C. for 1.5 hours in the presence of 100% steam. The obtained product was the zeolite provided by the present invention.

Said zeolite had an anhydrous chemical composition (based on mole ratios of the oxides, same for the following examples) as follows:

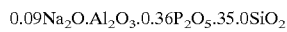

$0.09Na_2O.Al_2O_3.0.36P_2O_5.35.0SiO_2$

Said zeolite possesses X-ray diffraction pattern data as listed in Table 3. The surface $P_2O_5$ content in 5 crystal particles taken randomly from said zeolite was 2.2 wt. %, 2.6 wt. %, 2.5 wt. %, 2.6 wt. %, and 2.4 wt. %, respectively (The $P_2O_5$ content was determined by TEM-EDS method). The TEM micrograph of said zeolite was shown in FIG. 1 (The crystal particle size was about 1 micron). The $^{31}$P-MAS NMR spectra of said zeolite was shown in FIG. 2. The mesopore (3.2–4.9 nm) volume was 0.18 ml/g, and the micropore (10-membered ring, the MPD was about 0.5nm) volume was 0.165 ml/g.

TABLE 3

X-ray diffraction pattern data of the zeolite of the present invention

| d/ × 10⁻¹ nm | I/I₀, × 100 |
|---|---|
| 11.18 | 37 |
| 10.01 | 40 |
| 6.37 | 7 |
| 6.00 | 11 |
| 5.71 | 9 |
| 5.58 | 9 |
| 5.05 | 6 |
| 4.98 | 8 |
| 4.62 | 6 |
| 4.37 | 7 |
| 4.27 | 12 |
| 4.01 | 7 |
| 3.86 | 100 |
| 3.82 | 72 |
| 3.76 | 36 |
| 3.72 | 39 |
| 3.65 | 26 |
| 3.49 | 6 |
| 3.44 | 12 |
| 3.35 | 9 |
| 3.31 | 11 |
| 3.05 | 12 |

EXAMPLE 2

1.0 liter of water glass (manufactured by Catalyst Plant of Changling Petrochemical Works, containing 250.4 g/l $SiO_2$; 78.4 g/l $Na_2O$; $d_4^{20}$ 1.25) was heated to 80° C. 21.0 g of $NH_4Y$ zeolite (manufactured by Catalyst Plant of Changling Petrochemical Works, with silica/alumina mole ratio of 5.0, 90% dry base) was well dispersed into the above water glass while stirring. Then, an aqueous acidic $Al_2(SO_4)_3$ solution consisting of 76.5 ml of aqueous an $Al_2(SO_4)_3$ solution (containing 92.7 g/l $Al_2O_3$, $d_4^{20}$ 1.198,) and 175.7 ml of an aqueous 26.0 wt. % $H_2SO_4$ solution ($d_4^{20}$ 1.192) was added into the above-heated water glass solution while stirring, and reacted. Said reaction mixture was crystallized at 180° C. for 15 hours, followed by filtration and washing, the crystalline product was obtained.

100 g (dry base) of said crystalline product was ion-exchanged with 2000 g of an aqueous 3.0 wt. % $(NH_4)_2SO_4$ solution at 90° C. for 2 hours with stirring followed by filtration and washing. The obtained $NH_4^+$-form crystalline product was then dealuminated by reacting with 1000 g of an aqueous 1.25 wt. % $H_2SiF_6$ solution at 70° C. for 3 hours while stirring, followed by filtration and washing. Said dealuminated crystalline product was evenly mixed with 70 g of $H_2O$ and 16.8 g of phosphorus-alumina activating agent, composed of $Al(OH)_3$ powder and $H_3PO_4$, containing 1.45 wt. % $Al_2O_3$ and 12.0 wt. % $P_2O_5$, followed by drying at 110° C. for 5 hours, then activated at 550° C. for 2.0 hours in the presence of 100% steam. The obtained product was the zeolite prepared by the present invention.

The X-ray diffraction pattern data, the crystal particle size and the ³¹P-MAS NMR spectrum data of the above said zeolite were similar to the data shown in Table 3, FIG. 1 and FIG. 2, respectively. Said zeolite had an anhydrous chemical composition as follows:

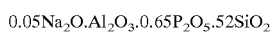

$0.05Na_2O.Al_2O_3.0.65P_2O_5.52SiO_2$

The surface $P_2O_5$ contents of 3 crystal particles taken randomly from said zeolite were 2.78 wt. %, 2.86 wt. %, and 2.75 wt. %, respectively. The mesopore (3.0–4.5 nm) volume was 0.08 ml/g, and the micropore (10-membered ring, with MPD about 0.5 mn) volume was 0.14 ml/g.

EXAMPLE 3

140 g of NaY zeolite was well dispersed in 5.2 liter of water glass (same as used in Example 2), having been heated to 100° C. while stirring. Then, the aqueous acidic $Al_2(SO_4)_3$ solution consisting of 458 ml of an aqueousn $Al_2(SO_4)_3$ solution (same as used in Example 2) and 804 ml of an aqueous dilute $H_2SO_4$ solution(same as used in Example 2) was added into the above-heated water glass solution while stirring. The obtained colloid was crystallized at 190° C. for 11 hours, followed by filtration and washing. 185 g (dry base) of said crystalline product was ion-exchanged with 1800 g of an aqueous 4.0 wt. % $(NH4)_2SO_4$ solution at 80° C. for 4 hours while stirring. After filtration, the filter cake was then dealuminated by reacting with 925 g of an aqueous 3.2 wt. % $H_2SiF_6$ solution at 90° C. for 1 hour while stirring, followed by filtration and washing. Said filter cake was evenly mixed with 90 g of $H_2O$ and 37.3 g of phosphorus-alumina activating agent, composed of pseudo-boehmite and $H_3PO_4$, containing 5.0 wt. % $Al_2O_3$ and 25.0 wt. % $P_2O_5$, followed by drying at 100° C. for 6 hours, then activated at 500° C. for 3.0 hours in the presence of 100% steam. The obtained product was the zeolite provided by present invention.

The X-ray diffraction pattern data, the crystal particle size and the 3 1p MAS NMR spectrum data of the above said zeolite were similar to the data shown in Table 3, FIG. 1 and FIG. 2, respectively. Said zeolite had an anhydrous chemical composition as follows:

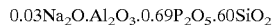

$0.03Na_2O.Al_2O_3.0.69P_2O_5.60SiO_2$

The surface $P_2O_5$ content of 3 crystal particles taken randomly from said zeolite was 2.50 wt. %, 2.49 wt. %, and 2.57 wt. %, respectively. The mesopore (3.5–4.7 nm) volume was 0.08 ml/g, and the micropore (10-membered ring, with MPD about 0.5 nm) volume was 0.150 ml/g.

EXAMPLE 4

180 g of HX zeolite having a silica/alumina mole ratio of 3.0 (90% dry base, manufactured by Nanjing Inorganic Chemical Plant, China) was well dispersed in 10.0 liter of water glass (same as used in Example 2, at ambient temperature) while stirring. Then, the aqueous acidic $Al_2(SO_4)_3$ solution consisting of 765.0 ml of an aqueous $Al_2(SO_4)_3$ solution ($d_4^{20}$ 1.198, 92.7 g/l $Al_2O_3$) and 1757.0 ml of an aqueous 26.0 wt. % dilute $H_2SO_4$ solution($d_4^{20}$ 1.192) was added into the above-heated water glass solution with stirring. Said reaction mixture was crystallized at 170° C. for 20 hours, followed by filtration and washing, the crystalline product was obtained.

100 g (dry base) said crystalline product was ion-exchanged with 2000 g of an aqueous 4.0 wt. % $NH_4Cl$ solution at 70° C. for 4 hours while stirring. After filtration, the $NH_4^+$-form filter cake was then dealuminated by reacting with 1000 ml of an aqueous 1.25 wt. % $H_2SiF_6$ solution at 95° C. for 3 hour while stirring, followed by filtration and washing.

Said filter cake was evenly mixed with 80 g of $H_2O$ and 25.1 g of phosphorus-alumina activating agent, composed of pseudo-boehmite and $H_3PO_4$, containing 3.0 wt. % $Al_2O_3$ and 12.5 wt. % $P_2O_5$, followed by drying at 120° C. for 6 hours, then activated at 450° C. for 5.0 hours in the presence of 100% steam. The obtained product was the zeolite prepared by the present invention. Said zeolite had an anhydrous chemical composition as follows:

0.04Na$_2$O.Al$_2$O$_3$.0.75P$_2$O$_5$.80SiO$_2$

The X-ray diffraction pattern data and the $^{31}$P-MAS NMR spectrum data of the above zeolite were similar to the data shown in Table 3 and FIG. 2, respectively. The average crystal particle size was about 1.8 micron determined by SEM. The surface P$_2$O$_5$ content of 3 crystal particles taken randomly from said zeolite was 3.24 wt. %, 3.42 wt. %, and 3.30 wt. %, respectively. The mesopore (3.7–5.0 nm) volume was 0.082 ml/g, and the micropore (10-membered ring, with MPD about 0.5 nm) volume was 0.157 ml/g.

EXAMPLE 5

205 g of NH$_4^+$- form crystalline product as prepared in Example 1, was dealuminated by reacting with 1640 g of an aqueous 2.5 wt. % H$_2$SiF$_6$ solution at 70° C. for 3 hours while stirring, followed by filtration and washing. Said filter cake was evenly mixed with 80 g of H$_2$O and 30.5 g of phosphorus-alumina activating agent, composed of pseudo-boehmite and H$_3$PO$_4$, containing 4.4 wt. % Al$_2$O$_3$ and 14.0 wt. % P$_2$O$_5$, followed by drying at 150° C. for 2 hours, then activated at 600° C., in self-steaming condition for 2.0 hours. The obtained product was the zeolite prepared by the present invention. Said zeolite had an anhydrous chemical composition as follows:

0.06Na$_2$O.Al$_2$O$_3$.0.80P$_2$O$_5$.70SiO$_2$

The X-ray diffraction pattern, data the crystal particle size and the $^{31}$P-MAS NMR spectrum data of the above said zeolite were similar to the data shown in Table 3, FIG. 1 and FIG. 2, respectively. The surface P$_2$O$_5$ content of 3 crystal particles taken randomly from said zeolite was 2.10 wt. %, 2.49 wt. %, and 2.52 wt. %, respectively. The mesopore (3.5–4.2 nm) volume was 0.16 ml/g, and the micropore (10-membered ring, with MPD about 0.5 nm) volume was 0.14 ml/g.

EXAMPLE 6

115 g (dry base) of NH$_4^+$- from crystalline product as prepared in Example 1, was dealuminated by reacting with 700 g of an aqueous 4.6 wt. % H$_2$SiF$_6$ solution at 80° C. for 2.5 hours while stirring, followed by filtration and washing. Said filter cake was evenly mixed with 50 g of H$_2$O and 34.8 g of phosphorus-alumina activating agent, composed of aluminum hydroxide and H$_3$PO$_4$, containing 1.0 wt. % Al$_2$O$_3$ and 7.0 wt. % P$_2$O$_5$, followed by drying at 120° C. for 4 hours, then activated at 400° C. for 4.0 hours in the presence of 100% steam. The obtained product was the zeolite prepared by the present invention. Said zeolite had an anhydrous chemical composition as follows:

0.04Na$_2$O.Al$_2$O$_3$.0.87P$_2$O$_5$.90SiO$_2$

The X-ray diffraction pattern data, the crystal particle size and the $^{31}$P-MAS NMR spectrum data of the above said zeolite were similar to the data shown in Table 3, FIG. I and FIG. 2, respectively. The surface P$_2$O$_5$ content of 3 crystal particles taken randomly from said zeolite was 1.90 wt. %, 2.10 wt. %, and 2.23 wt. %, respectively. The mesopore (3.2–4.5 nm) volume was 0.12 ml/g, and the micropore (10-membered ring, with MPD about 0.5 nm) volume was 0.150 ml/g.

Comparative Example 1

The corresponding conventional ZSM-5 zeolite (produced by the Catalyst Plant of Qilu Petrochemical Corp., China, ethyl amine as template) was prepared according to the method as described in Petroleum Processing (Chinese), No.11–12, p.88, 1978. Said conventional zeolite ZSM-5 was ion-exchanged with an aqueous (NH$_4$)$_2$(SO$_4$)$_3$ solution under the same conditions as described in Example 1. The filter cake was then calcined at 560° C. for 2 hours. The obtained product had an anhydrous chemical composition as follows:

0.04Na$_2$O.Al$_2$O$_3$.60SiO$_2$

The mesopore (3.0–5.0 nm) volume was 0.02 ml/g, and the micropore (10-membered ring, with MPD about 0.5 nm) volume was 0.169 ml/g.

EXAMPLE 7

This example shows the hydrothermal stability of the zeolite prepared by the present invention.

The zeolite samples prepared in Example 1 and Comparative Example 1 were treated and aged in 100% steam at 800° C. for 1, 4, 8 and 12 hours, respectively. Said aged zeolite samples were then tested in a pulse reactor at 480° C., using n-C$_{14}$ alkane as feedstock to evaluate cracking activity, wherein activity=(1−fraction of unconverted n-C$_{14}$)×100%. The dosage of n-C14 alkane was 0.5 μl, and 0.1 g of the zeolite sample was loaded in the reactor. The results were listed in Table 4. It can be seen that the hydrothermal stability of the zeolite of the present invention is significantly higher than that of the corresponding conventional ZSM-5.

TABLE 4

| Aging Time | n-C$_{14}$ cracking activity | |
|---|---|---|
| (hr.), 800° C. | Example 1 | Comparative Example 1 |
| 1 | 99 | 90 |
| 4 | 99 | 70 |
| 8 | 99 | 50 |
| 12 | 98 | 35 |

EXAMPLE 8

This example shows the heavy oil cracking performance of the zeolite of the present invention.

Zeolite samples prepared in Example 1 or Comparative Example 1 (A), REUSY (Rare Earth exchanged Ultrastable Y type zeolite, manufactured by Catalyst Plant of Changling Petrochemical Works, designated as B), kaolin (C) and pseudo-boehmite (D) were mixed according to the weight ratio of A:B:C:D=15:10:56:19, homogenized and spray-dried to obtain two catalysts labeled as Cat-1 and Ref-1, respectively.

The prepared catalysts were treated at a temperature of 800° C. for 4 hours in the presence of 100% steam, and then tested in a fixed-fluidized bed reactor in order to compare the differences between the two catalysts in increasing gasoline octane value and decreasing sulfur content of gasoline. Before evaluation, the two catalysts were well mixed, according to a weight ratio of 85:15, with a commercial equilibrium catalyst SRNY (taken from the Resid FCC Unit of Changling Petrochemical Works), respectively. The two well-mixed catalysts were then evaluated under reaction conditions: 500° C., cat/oil ratio 3.0 and WHSV 20.0 h$^{-1}$. The feedstock used was a blend of VR and VGO according to a weight ratio of VR: VGO =20:80. The properties of the feedstock were listed in Table 5. The evaluation results were listed in Table 6. The data listed in Table 6 indicate that as compared with the conventional HZSM-5 zeolite, the zeolite of the present invention exhibits superior heavy oil crackability, better performance in increasing gasoline octane value and decreasing sulfur content in the gasoline and improved induction period of the gasoline as well.

TABLE 5

Feed Properties

| | |
|---|---|
| IBP, ° C. | 224 |
| 50 v % BP, ° C. | 460 |
| $d_{20}$·g · $ml^{-1}$ | 0.8995 |
| viscosity, cP(80° C.) | 20.4 |
| Freezing Point, ° C. | 41 |
| Carbon Residue, wt. % | 2.17 |
| Heavy Metals, ppm | |
| Na | 1.7 |
| Fe | 2.0 |
| Ni | 1.7 |
| V | 0.1 |
| Cu | <0.1 |

TABLE 6

| Catalyst | SRNY Eq. Cat. | Eq. Cat. plus Cat-1 | Eq. Cat. plus Ref.-1 |
|---|---|---|---|
| Conversion, wt % | 65.93 | 70.89 | 69.45 |
| Product yields, wt. % | | | |
| Hydrogen | 0.15 | 0.15 | 0.16 |
| $C_1$~$C_2$ | 1.24 | 1.59 | 1.45 |
| $C_3$~$C_4$ | 12.23 | 19.26 | 15.87 |
| Gasoline ($C_5$~221° C.) | 45.28 | 43.59 | 43.62 |
| LCO(221~330° C.) | 19.98 | 18.80 | 19.06 |
| Heavy Oil(>330° C.) | 14.09 | 10.30 | 11.47 |
| Coke | 7.04 | 8.31 | 8.38 |
| Gasoline RON(c) | 88.2 | 90.6 | 89.3 |
| MON(c) | 78.03 | 80.3 | 79.2 |
| Gasoline Induction Period (min) | 463 | 620 | 100 |
| Gasoline Sulfur Content (ppm) | 215 | 143 | 200 |

What we claim is:

1. A phosphorus-containing zeolite having MFI structure, having an anhydrous chemical composition based on mole ratios of oxides of the formula:

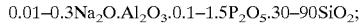

0.01–0.3$Na_2O$·$Al_2O_3$·0.1–1.5$P_2O_5$·30–90$SiO_2$;

possessing a X-ray diffraction pattern data listed in Table 1; and having the pore volume ratio of 1.0–10 nm mesopore to 10-membered ring pore being no less than 0.5.

2. A zeolite according to claim 1, wherein the pore volume ratio of 3.0–5.0 nm mesopore to 10-membered ring pore in said zeolite is no less than 0.5.

3. A zeolite according to claim 1, wherein said zeolite is characterized in a peak at about 40ppm (chemical shift) in $^{27}$Al-MAS NMR spectrum and a peak at about −29 ppm in $^{31}$P-MAS NMR spectrum.

4. A zeolite according to claim 1, wherein the crystal particle size of said zeolite is in the range of 0.8–2 micron.

5. A process for preparing the zeolite according to claim 1, comprising the steps of crystallizing a reaction system comprising an aluminum salt, an inorganic acid, water and a seed crystal selected from a $Na^+$, $H^+$ or $NH_4^+$-form faujusite; ion-exchanging the crystalline product into $NH_4^+$-form; dealuminating the $NH_4^+$-form crystalline product with $H_2SiF_6$; and activating the dealuminated crystalline product by an activation agent containing phosphorus and aluminum at elevated temperature in the presence of steam.

6. A process according to claim 5, wherein said crystallizing step comprises the steps of dispersing the seed crystal of NaY, $NH_4Y$, NaX or HX into a mixture comprising an aluminum salt, an inorganic acid, water and water glass preheated to 60–100° C. to result in a colloid system with mole ratios of $SiO_2$/$Al_2O_3$=30–100, $Na_2O$/$Al_2O_3$=5–10, $H_2O$/$SiO_2$=15–50 and crystallizing said colloid system at 130–200° C. for 10–60 hours.

7. A process according to claim 6, wherein said seed crystal is zeolite $NH_4Y$ or HY.

8. A process according to claim 5 or 6, wherein said aluminum salt is selected from $Al_2(SO_4)_3$, $AlCl_3$, $AlPO_4$, $Al_2(HPO_4)_3$ or $Al(H_2PO_4)_3$.

9. A process according to claim 5 or 6, wherein said inorganic acid is selected from $H_2SO_4$, $H_3PO_4$, HCl, or $HNO_3$.

10. A process according to claim 5, wherein said ion exchange step is carried out according to the weight ratio of crystalline product:inorganic ammonium salt:water=1:(0.2–1.0):(5–20) at a temperature of 60–95° C. for 0.5–2 hours.

11. A process according to claim 10, wherein said inorganic ammonium salt is selected from $(NH_4)_2SO_4$, $NH_4Cl$, or $(NH_4)_3PO_4$.

12. A process according to claim 5, wherein said dealuminating step is carried out according to the weight ratio of $NH_4^+$-form crystalline product:$H_2SiF_6$:water=1:(0.050.30):(3–20) at a temperature of 50–70° C. for 1–5 hours.

13. A process according to claim 5, wherein said activating step is carried out by evenly mixing the dealuminated crystalline product with an activating agent containing phosphorus and aluminum, according to the weight ratio of dealuminated crystalline product:activating agent (based on $P_2O_5$)=1:(0.05–0.80), followed by calcining at 400–650° C., in the presence of 10–100 % steam for 1–5 hours.

14. A process according to claim 13, wherein said activating agent containing phosphorus and aluminum is composed of pseudo-boehmite and phosphoric acid according to the mole ratio of $Al_2O_3$: $P_2O_5$=1:(3–6).

* * * * *